(12) United States Patent
Raman et al.

(10) Patent No.: US 11,372,852 B2
(45) Date of Patent: Jun. 28, 2022

(54) NAMED ENTITY EXTRACTION IN AUTOMATED CHAT ASSISTANT

(71) Applicant: MORGAN STANLEY SERVICES GROUP INC., New York, NY (US)

(72) Inventors: Rama Raman, Bangalore (IN); Amit Kumar Singh, Bangalore (IN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 511 days.

(21) Appl. No.: 16/544,596

(22) Filed: Aug. 19, 2019

(65) Prior Publication Data

US 2021/0056098 A1 Feb. 25, 2021

(51) Int. Cl.
| | |
|---|---|
| *G06F 16/242* | (2019.01) |
| *G06F 16/2457* | (2019.01) |
| *G10L 15/22* | (2006.01) |
| *G10L 15/18* | (2013.01) |
| *G06F 40/284* | (2020.01) |
| *G06F 40/295* | (2020.01) |
| *G10L 15/30* | (2013.01) |
| *G06F 40/30* | (2020.01) |

(52) U.S. Cl.
CPC ...... *G06F 16/243* (2019.01); *G06F 16/24575* (2019.01); *G06F 40/284* (2020.01); *G06F 40/295* (2020.01); *G06F 40/30* (2020.01); *G10L 15/1815* (2013.01); *G10L 15/22* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 10,503,468 | B2* | 12/2019 | Thangarathnam | .... G06F 40/295 |
| 11,151,986 | B1* | 10/2021 | Rajbhandari | ....... G10L 15/1815 |
| 2011/0069822 | A1* | 3/2011 | Jan | .......................... G06F 40/30 |
| | | | | 379/88.04 |
| 2019/0087455 | A1* | 3/2019 | He | .......................... G06F 40/35 |
| 2019/0272296 | A1* | 9/2019 | Prakash | ................. G06N 7/005 |
| 2020/0380076 | A1* | 12/2020 | Taylor | .................... G06F 40/35 |
| 2020/0410989 | A1* | 12/2020 | Ray | ........................ G06N 20/00 |

* cited by examiner

*Primary Examiner* — Robert W Beausoliel, Jr.
*Assistant Examiner* — Cheryl M Shechtman
(74) *Attorney, Agent, or Firm* — Weitzman Law Offices, LLC (57) ABSTRACT

A system for providing responses to natural language queries or commands is disclosed. The system comprises a server comprising a processor and non-transitory memory storing instructions that cause the processor to: retrieve a stored data structure comprising a plurality of named entities; receive a natural language query or command from a human user; extract one or more named entities from the query or command, wherein the extraction comprises iteratively: dividing the query or command into overlapping sets of tokens, determining whether a set of tokens corresponds to a named entity from the plurality of named entities, extracting any corresponding set of tokens from the query, and if no corresponding sets remain, decreasing the set size and repeating; and based at least in part on the query or command and on the extracted one or more named entities, act to fulfill a user intent expressed by the query or command.

16 Claims, 7 Drawing Sheets

NAMED ENTITY EXTRACTION IN AUTOMATED CHAT ASSISTANT

FIELD OF INVENTION

This application relates to methods for performing computational linguistics, and more specifically, to methods and systems for parsing a natural language input to simplify processing by a computing system.

BACKGROUND

Many automated assistants in home or mobile devices (e.g., Alexa, Siri, or Google Voice Assistant) are configured to receive a user's question, such as "What will tomorrow's weather be?" or "What is the capital of Brunei?", parse the question, and make a best attempt to answer it. Many websites also offer a customer service chat window to aid users in navigating the website or being connected to the right customer service representative to help them. In many cases, it is more cost-effective to have an artificial intelligence system process the initial query and determine whether the system has a sufficiently high confidence that the user's intent is known and can be satisfied, or if the query must be escalated to a human representative.

As a result, better computational linguistic methods for processing a received natural language query are desirable, both to increase the proportion of user queries that may be answered by a computing system without needing to use a human representative, and to increase system responsiveness by not delaying a response until the human representative has considered the query and responded. Although some existing systems use only a maximum entropy model to interpret and act upon a communication, these models can be vulnerable to underfitting or overfitting the data during training, require ever larger training data sets to increase accuracy, and are more likely to misinterpret a communication containing a novel word even when the word functions only as a title of a noun and should not affect interpretation the general meaning of the communication.

SUMMARY OF THE INVENTION

Disclosed herein is a system for providing responses to natural language queries or commands. The system comprises a server comprising a processor and non-transitory memory storing instructions that cause the processor to: retrieve a stored data structure comprising a plurality of named entities; receive a natural language query or command from a human user; extract one or more named entities from the query or command, wherein the extraction comprises iteratively: dividing the query or command into overlapping sets of tokens, determining whether a set of tokens corresponds to a named entity from the plurality of named entities, extracting any corresponding set of tokens from the query, and if no corresponding sets remain, decreasing the set size and repeating; and based at least in part on the query or command and on the extracted one or more named entities, act to fulfill a user intent expressed by the query or command.

Further disclosed is a method for acting in response to natural language queries or commands, comprising: retrieving, by a computing device, a stored data structure comprising a plurality of named entities; receiving, by the computing device, a natural language query or command from a human user; extracting, by the computing device, one or more named entities from the query or command, wherein the extraction comprises iteratively: dividing the query or command into overlapping sets of tokens of a given set size, determining whether a set of tokens corresponds to a named entity from the plurality of named entities, extracting any corresponding set of tokens from the query, and if no corresponding sets remain, decreasing the set size and repeating; and based at least in part on the query or command and on the extracted one or more named entities, acting, by the computing device, to fulfill a user intent expressed by the query or command.

DETAILED DESCRIPTION

Figure 1:
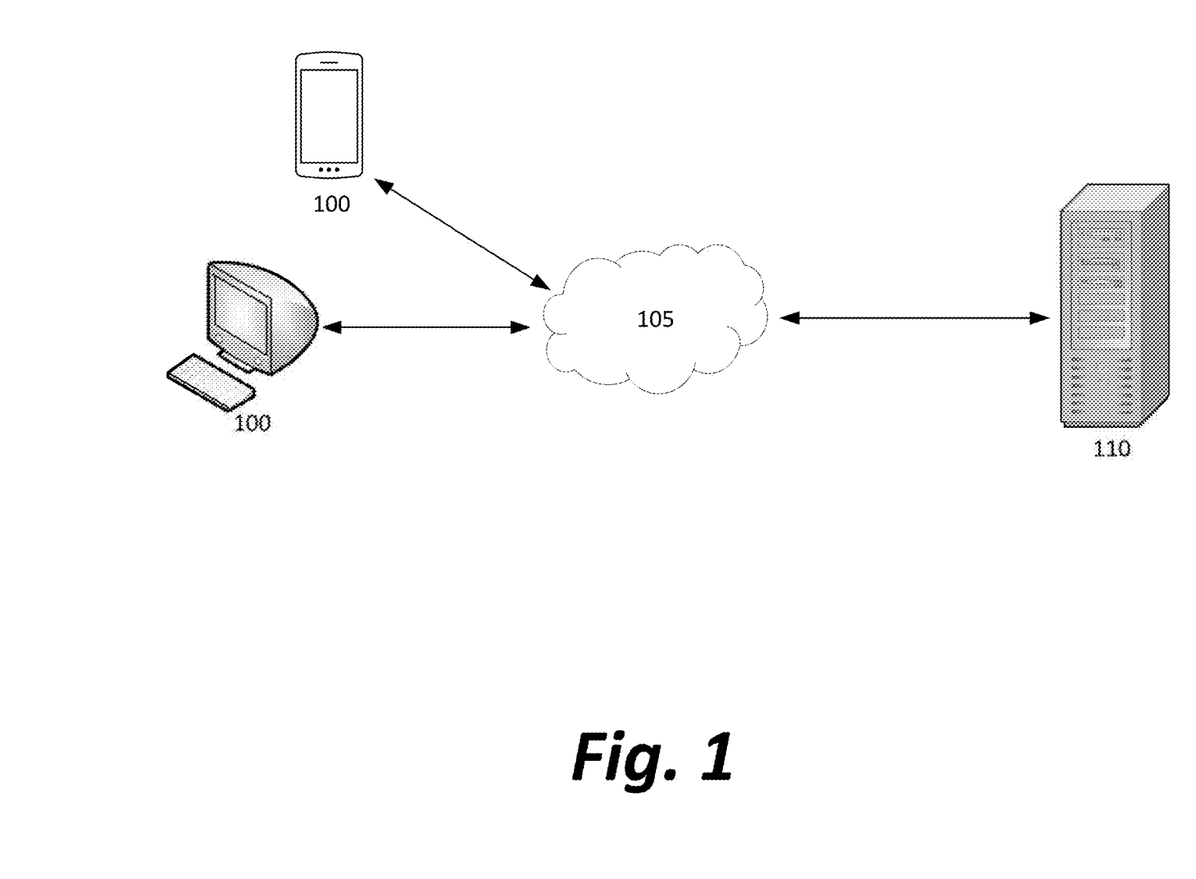
FIG. 1 depicts a computing system for transmitting and receiving natural language queries from a human user.

FIG. 1 depicts a computing system for transmitting and receiving natural language queries from a human user.

An end user's client computing device 100 (which may be, for example, a desktop computer, laptop computer, mobile computing device, smart television, gaming console, voice assistant, or any other form of device for media consumption or communication) may connect via a network 105 to a server computing device 110 to enable a user of client computing device 100 to transmit queries that are answered by computing device 110. The server computing device 110 may be, in a preferred embodiment, a web server that receives HTTP (Hypertext transfer protocol) requests and responds with data for display via a web browser on client computing device 100, but in other embodiments may be any kind of server computing device that is listening for queries or commands from a client and transmitting responses to what has been received.

In other embodiments, client computing device 100 and server computing device 110 may communicate via other means than a webpage generated by server 110 and displayed in a browser of client 100. Client 100 may run a separate designated application for communication with server 110, or may use an already existing communications protocol, such as an online instant messaging service, text message service of a mobile device, Skype, email, or any number of other protocols for the communication of data from a source to a destination.

Network 105 may be, in some embodiments, the Internet as a whole, while in other embodiments, it may be a more localized or specific network, such as a LAN (local area network), WAN (wide area network), ethernet, VPN (virtual private network), or other subset of computers in connectivity with one another. In alternative embodiments, network 105 may be unnecessary, and the server software that would have been run on server 110 may run as an application on the client computing device 100. Connections may avoid the use of a network through direct wired or wireless transmission to send data to and from server 110. As depicted in FIG. 1, arrows show data flow to and from the network 105.

Figure 2:
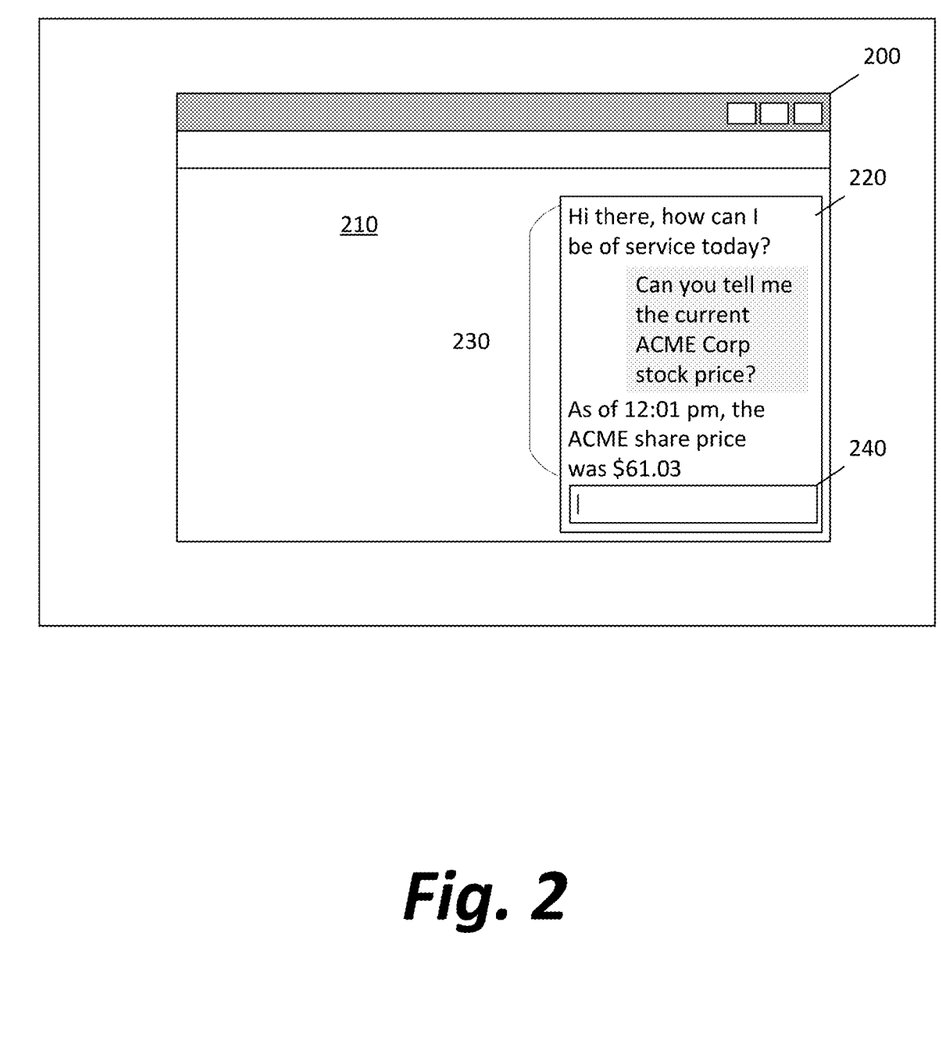
FIG. 2 depicts a chatbot interface for a human user to enter a query and see the results of a query.

FIG. 2 depicts a chatbot interface for a human user to enter a query and see the results of a query.

A user may open a browser window 200 and navigate to a particular website URL (uniform resource locator). After loading website data transmitted by the server 110 and converting the data into a visual page 210, page 210 may comprise a window or other element 220 for displaying text, including past communications 230, and a text box 240 for entry of new queries. After the user types text into text box 240 and submits it, it is added to the past communications 230 and a script running in the background of page 210 may transmit the query to the server 110 and receive a response from server 110 generated according to a method depicted in FIG. 3, and described below.

In alternative embodiments, other forms of user interfaces could be used. For example, instead of typing to enter text, a user could use voice input into a microphone, which is then transcribed to the webpage before submitting. The interface could be provided by means of a mobile app instead of a web browser.

Figure 3:
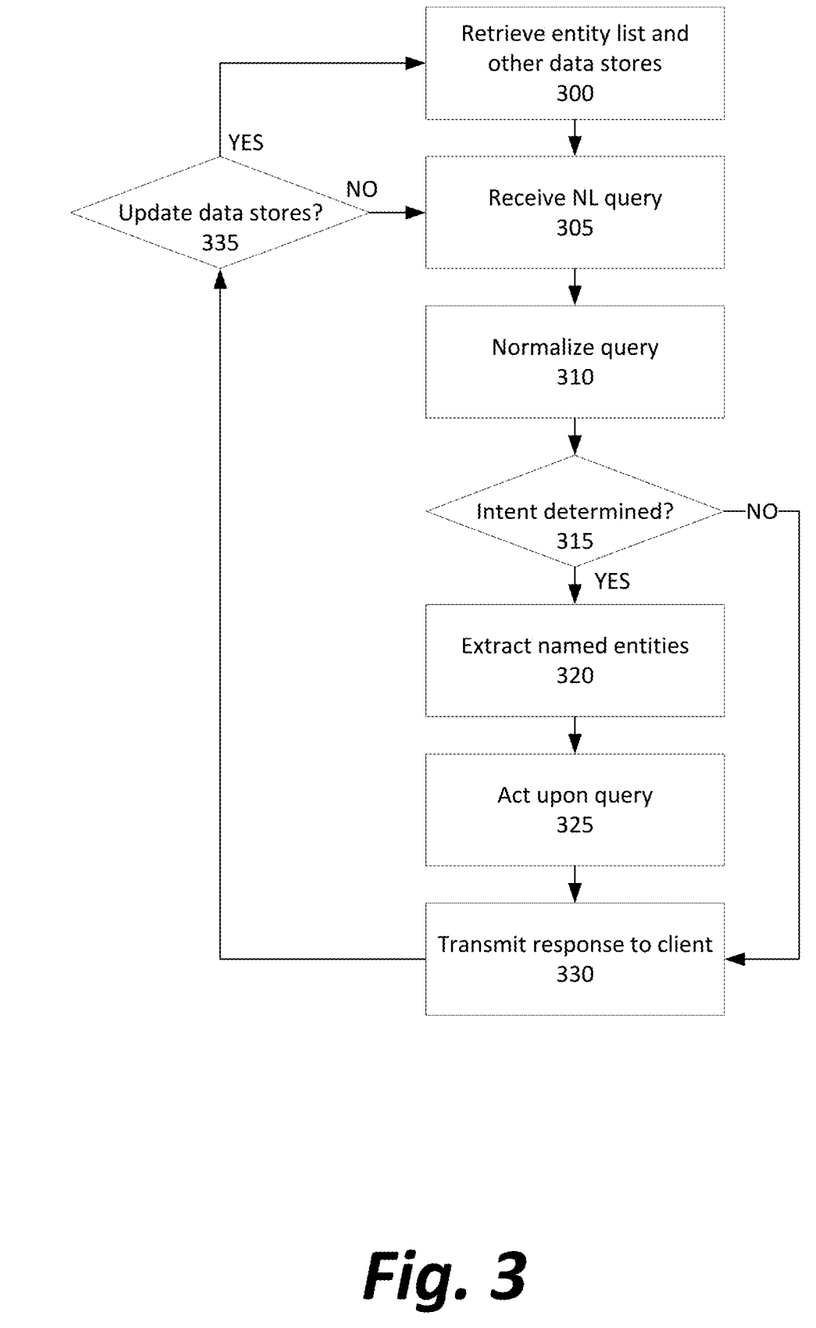
FIG. 3 depicts a method for generally supplying information via a named entity—extracting bot.

FIG. 3 depicts a method for generally supplying information via a named entity-extracting bot.

Initially, software running on server 110 may retrieve, receive, or otherwise generate or store a list of named entities (Step 300). In a preferred embodiment, these named entities may include a number of proper nouns, such as the names of persons, companies, titles of. The list may also include a number of metrics, properties, or characteristics that describe the other named entities. For example, in an application for querying baseball players, the list of named entities might include "Babe Ruth," "Hank Aaron," "Joe DiMaggio," "runs batted in," and "batting average"; an application for querying cinematic data might include "George Lucas," "The Empire Strikes Back," "total box office receipts," and "release date."

Next, the software receives a natural language query or command from a human user of the client 100 (Step 305).

The query may undergo some form of normalization (Step 310) through preprocessing by a normalization module. The query may be tokenized (i.e., divided up from a single string into an array of substrings based on boundaries such as spaces, hyphens, periods, etc., likely resulting in a set of single words, but potentially being divided based on another criterion), the tokens stemmed (i.e., having certain substring prefixes or suffixes removed, such as replacing "running" with "run" or "dollars" with "dollar"), the tokens lemmatized (i.e., replacing all forms of a word with a base form of the word, such as replacing "are," "is," "was," and "were" with "be"), and/or other text processing, such as converting all characters to lowercase, removing characters that are not-alphanumeric, or removing characters that are not ASCII, etc.

The query is then processed by an intent extraction module to determine a user intent (Step 315). In a preferred embodiment, a maximum entropy model is used to determine a most likely interpretation of the query's general form, such as asking for the current value of a metric of a named entity, or issuing a command, or requesting meta-information on how the system works rather than information the system is meant to provide, etc.

If the user's intent is determined to a sufficient confidence level, the query will be processed and acted upon; if not, the system may skip processing the query and prepare a response to the user indicating that the query was unintelligible and asking for clarification or suggesting possible query or command formats that were meant.

The normalized query then undergoes named entity extraction (Step 320) by an entity extraction module, which is described more fully below and depicted in FIGS. 4, 5A, and 5B, to group tokens into single named entities and associate them with the already known named entities of the list.

The query may then be processed by using any identified intent, named entity, and metrics of the query to search data stores of server 110, or remote data stores accessible to server 110 (Step 325). For example, if the query contains the entities "ACME Corp." and "stock price," there may be an accessible database of companies having a column of stock prices, which server 110 may query to find the row with ACME Corp. and return the column's value for that row. If the query is actually a command (e.g., "Please set automated thermostat to 70 degrees" or "Please sell 100 shares of ACME Corporation stock"), server 110 may act upon the command using an API (application programming interface) or communications interface of another device or software application.

After acting on the query/command, or determining that the query is insufficiently determined to be acted upon, server 110 may transmit a response to the query (such as the value requested, or an error message) or a confirmation of the command's receipt to client 100 and the human user (Step 330).

Server 100 may be configured to check for updates (Step 335) to the data stores, including the named entity list, at regular intervals. For example, the cached entity list may be updated every 1 minute, or 5 minutes, or after other periods of time. In another embodiment, server 100 may await a push notification from a data store indicating that the data store has changed before requesting an updated copy of the entity list or other cached data.

If no updates are needed, or once the update is complete, server 100 may then continue to listen for a new query (returning to Step 305). In some embodiments, the server 100 may remember information about the conversation state to reduce ambiguity in subsequent queries. For example, if the first query is "What is ACME corporation's stock price?", and the second is "What is its price to earnings ratio?", the system may, during the second query's normalization, replace the pronoun "its" with "ACME corporation's" based on the previous query.

Figure 4:
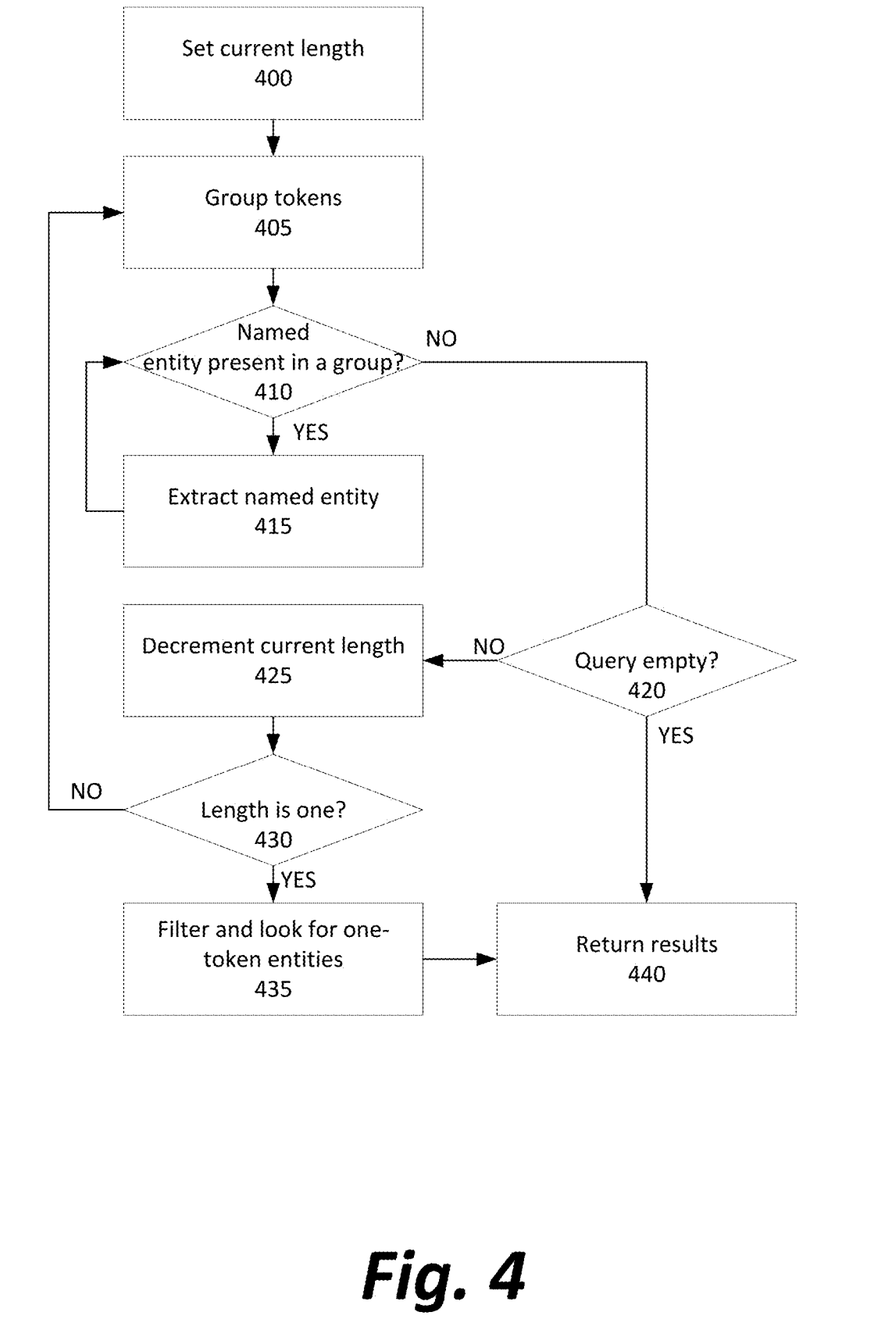
FIG. 4 depicts a method for the specific step of entity extraction within the method of FIG. 3.

FIG. 4 depicts a method for the specific step of entity extraction within the method of FIG. 3.

Initially, a maximum token grouping length is set (Step 400). In some embodiments, this may be set to a predetermined number independent of the query or the problem domain, such as five. In other embodiments, it may be set to the length of the longest named entity in the stored list of named entities, or variable based on a characteristic of the query.

Starting with a current length equal to the maximum length, tokens are grouped (Step 405) into overlapping sets of the current length. For example, if the current length is five, tokens #1-5 are associated as a set, #2-6 are associated as a set, #3-7 are associated as a set, and so on. (See FIGS. 5A and 5B, described further below, for a depiction of this process).

Each set of tokens is then checked for presence in the list of named entities (Step 410). If one is present, it is extracted (Step 415) from the query string and stored separately, while the algorithm continues on the remainder of the string. If the extracted entity is not at the beginning or end of the query, the remainder substrings before and after it may be concatenated, but in a preferred embodiment, the algorithm should continue recursively and independently on each remainder substring, as it is unlikely for a named entity to be separated by a longer named entity within it in the original query.

If the query is not empty (Step 420) after checking every set of tokens at the current length, the current length is decremented (Step 425).

If the current length is greater than one (Step 430), the process repeats with iteratively shorter sets of tokens being examined in search of named entities. If the current length is equal to one, every remaining token may be checked (Step 435) to determine whether it is a named entity, a token that may be helpful in clarifying the query, or only a grammatical filler that can be filtered out without affecting the query fulfillment.

Once either the query has been filtered at the one-token level or has been completely extracted into named entities, the named entities can be returned (Step 440) for use within the method described above and in FIG. 3.

Figure 5A:
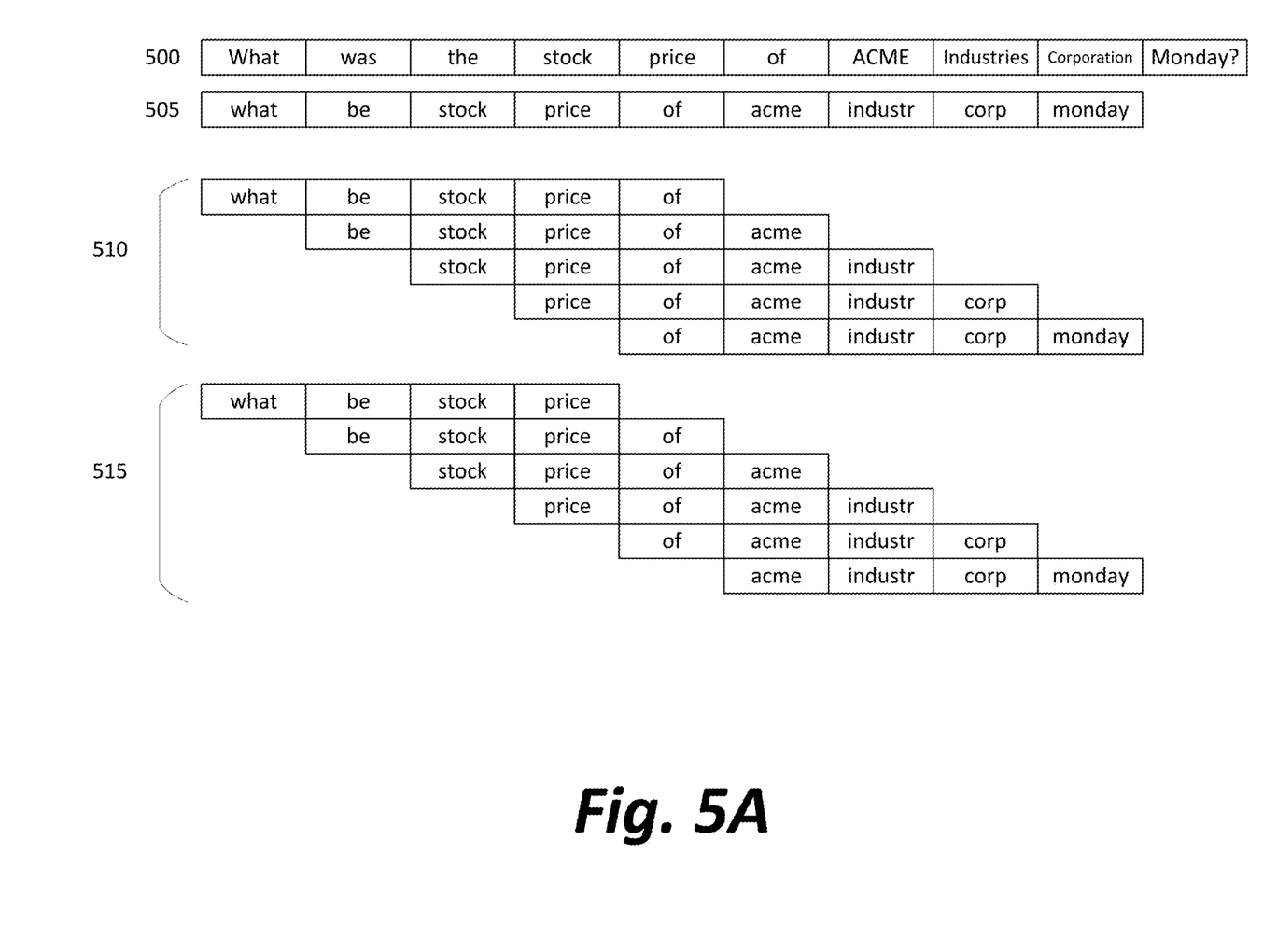
FIGS. 5A and 5B depict visually the iterative token grouping process of FIG. 4.
Figure 5B:
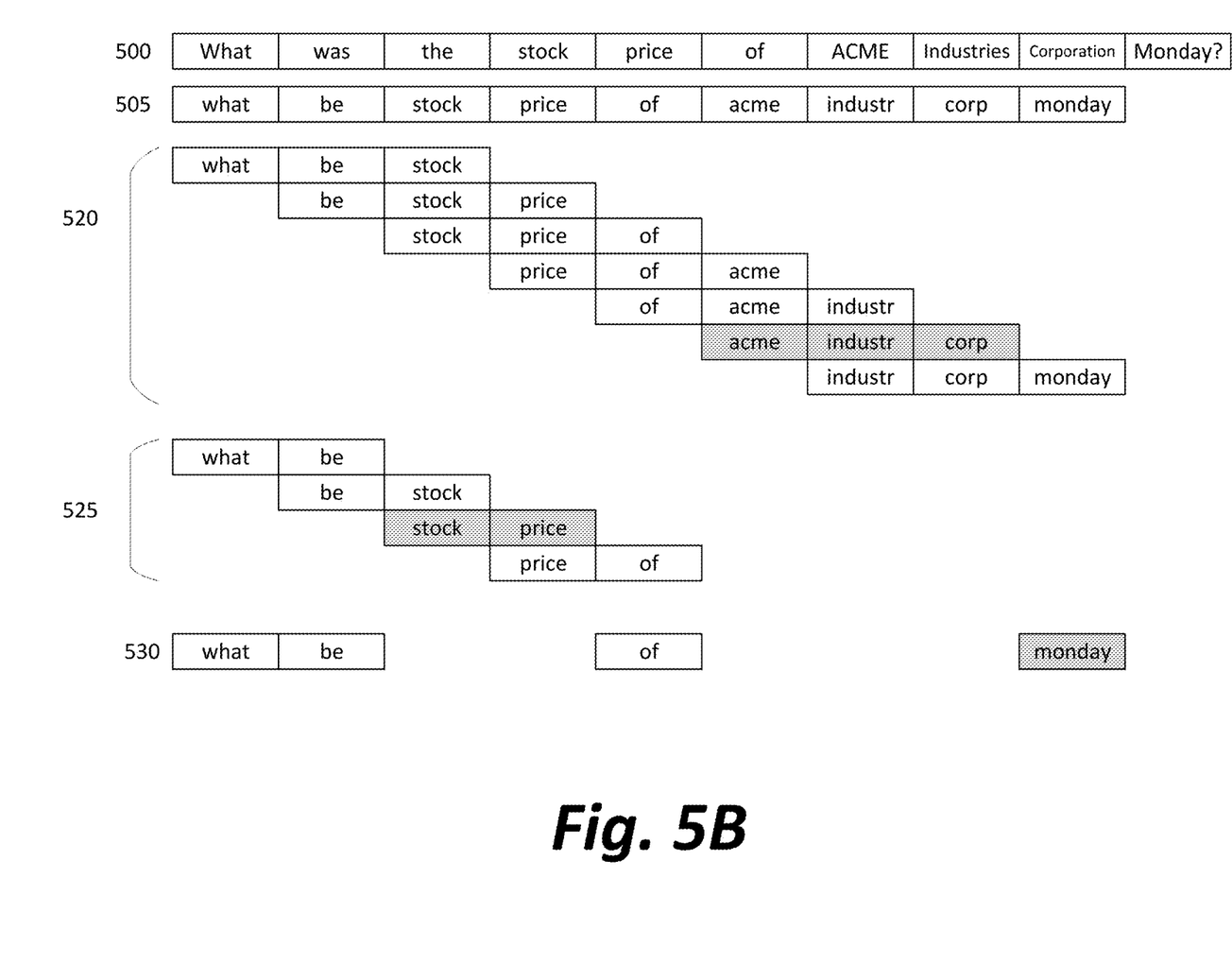

FIGS. 5A and 5B depict visually the iterative token grouping process of FIG. 4.

Initial query 500 (for example, "What was the stock price of ACME Industries Corporation Monday?") is divided into 10 tokens based on the presence of spaces in the input. After normalization, the normalized query 505 may be, for example, "what be stock price acme industr corp monday", having removed punctuation, uppercase, stemming and lemmatizing some words, and having removed an article.

First, the normalized query is divided into five overlapping sets 510 of five tokens each, which are compared to the stored list of named entities.

When no set 510 matches a known named entity, the normalized query 505 is redivided into six overlapping sets 515 of four tokens each and again compared to the list.

When no set 515 matches a known named entity, the normalized query 505 is redivided into seven overlapping sets 520 of three tokens each. This time, however, a match is found for "acme industr corp" within the named entities list. These tokens are removed, and the process continues with division of the remainder into sets 525 of two tokens each.

Now, the metric "stock price" is identified and likewise removed. No other two token sets match a named entity, so finally, each remaining token 530 is examined to see whether it is a standard English word that is being used only to form the question and set up the relations between entities (such as "what," "be," and "of") or is actually a relevant entity to the query ("monday").

Figure 6:
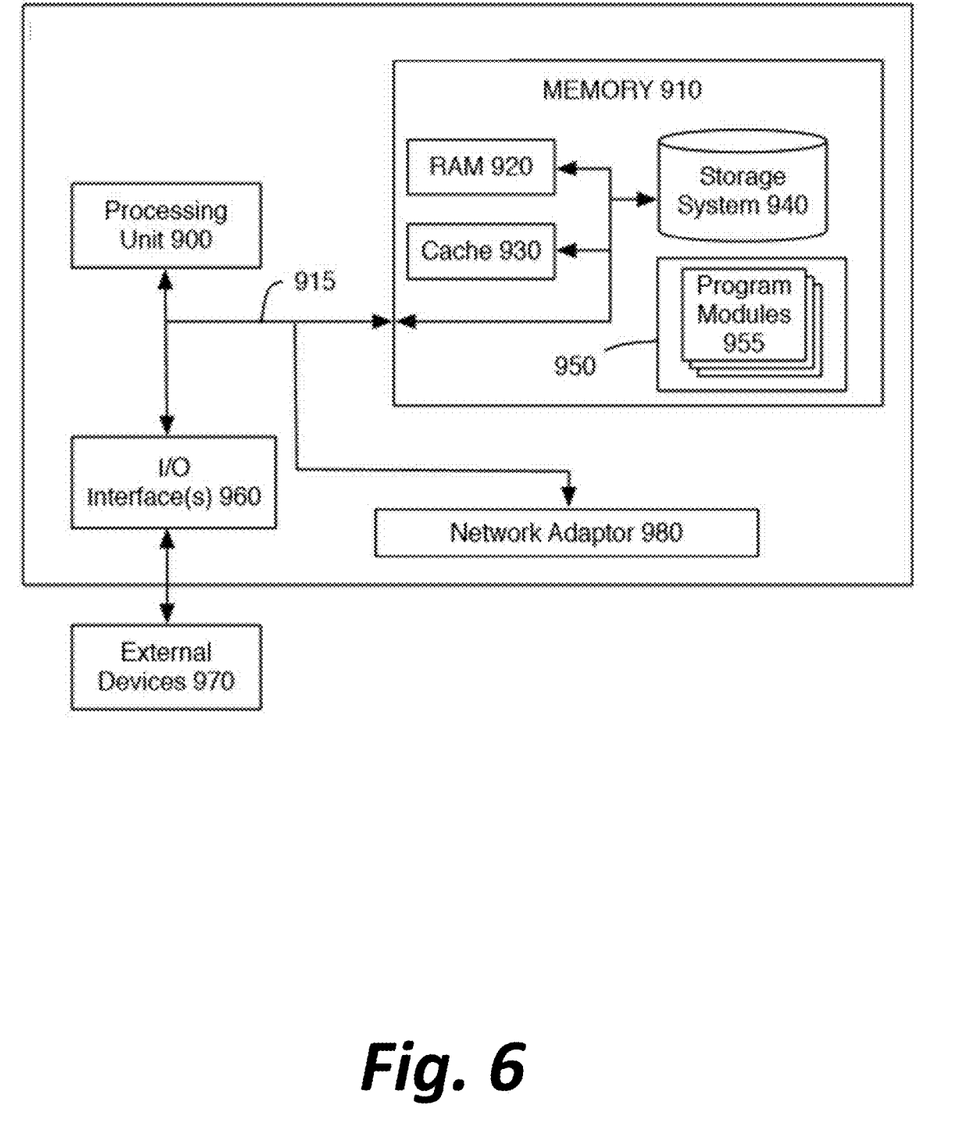
FIG. 6 depicts a general computing device for performing a number of features described above.

FIG. 6 is a high-level block diagram of a representative computing device that may be utilized to implement various features and processes described herein, for example, the functionality of client computing device 100 or server computing device 110. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A system for providing responses to natural language queries or commands, comprising:
   a server comprising a processor and non-transitory memory storing instructions that, when executed by the processor, cause the processor to:
      retrieve a stored data structure comprising a plurality of named entities;
      receive a natural language query or command from a human user;
      extract one or more named entities from the query or command, wherein the extraction comprises iteratively:
         dividing the query or command into overlapping sets of tokens of a given set size,
         determining whether a set of tokens corresponds to a named entity from the plurality of named entities,
         extracting any corresponding set of tokens from the query, and
         if no corresponding sets remain, decreasing the given set size and repeating; and
      based at least in part on the query or command and on the extracted one or more named entities, act to fulfill a user intent expressed by the query or command, wherein acting to fulfill a user intent comprises transmitting a message for display to the human user.

2. The system of claim 1, wherein the query or command comprises text written by the human user or transcribed from the human user's voice.

3. The system of claim 1, wherein the human user enters the query or command via an input device of the server itself.

4. The system of claim 1, wherein the extraction further comprises: after extracting a corresponding set of tokens, recursively extracting from substrings on either side of the extracted corresponding set of tokens, without rejoining the substrings.

5. The system of claim 1, wherein the tokens are words.

6. The system of claim 1, wherein a conversation state is stored for interpreting future queries.

7. The system of claim 1, wherein the stored data structure comprises a plurality of metrics associated with named entities.

8. The system of claim 1, wherein acting to fulfill a user intent is additionally based on use of a maximum entropy model on the query or command to determine a user intent.

9. A method for acting in response to natural language queries or commands, comprising:
   retrieving, by a computing device, a stored data structure comprising a plurality of named entities;
   receiving, by the computing device, a natural language query or command from a human user;
   extracting, by the computing device, one or more named entities from the query or command, wherein the extraction comprises iteratively:
      dividing the query or command into overlapping sets of tokens of a given set size,
      determining whether a set of tokens corresponds to a named entity from the plurality of named entities,
      extracting any corresponding set of tokens from the query, and
      if no corresponding sets remain, decreasing the given set size and repeating; and
   based at least in part on the query or command and on the extracted one or more named entities, acting, by the computing device, to fulfill a user intent expressed by the query or command, wherein acting to fulfill a user intent comprises transmitting a message for display to the human user.

10. The method of claim 9, wherein the query or command comprises text written by the human user or transcribed from the human user's voice.

11. The method of claim 9, wherein the human user enters the query or command via an input device of the computing device itself.

12. The method of claim 9, wherein the extraction further comprises: after extracting a corresponding set of tokens, recursively extracting from substrings on either side of the extracted corresponding set of tokens, without rejoining the substrings.

13. The method of claim 9, wherein the tokens are words.

14. The method of claim 9, wherein a conversation state is stored by the computing device for interpreting future queries.

15. The system of claim 9, wherein the stored data structure comprises a plurality of metrics associated with named entities.

16. The system of claim 9, wherein acting to fulfill a user intent is additionally based on use of a maximum entropy model on the query or command to determine a user intent.

* * * * *